United States Patent
Haefner et al.

(10) Patent No.: US 12,072,118 B2
(45) Date of Patent: Aug. 27, 2024

(54) METHOD AND DEVICE FOR OPERATING A VENTILATION SYSTEM FOR AIR IN AN INDOOR SPACE

(71) Applicant: Carl Freudenberg KG, Weinheim (DE)

(72) Inventors: Uwe Haefner, Kehl (DE); Sascha Blauth, Rodenbach (DE); Maik Sieh, Sandhausen (DE)

(73) Assignee: CARL FREUDENBERG KG, Weinheim (DE)

(*) Notice: Subject to any disclaimer, the term of this patent is extended or adjusted under 35 U.S.C. 154(b) by 186 days.

(21) Appl. No.: 17/584,415

(22) Filed: Jan. 26, 2022

(65) Prior Publication Data
US 2022/0243946 A1    Aug. 4, 2022

(30) Foreign Application Priority Data
Feb. 3, 2021   (DE) ............... 10 2021 102 517.6

(51) Int. Cl.
*F24F 11/65* (2018.01)
*B60H 1/24* (2006.01)
(Continued)

(52) U.S. Cl.
CPC .............. *F24F 11/65* (2018.01); *B60H 1/24* (2013.01); *F24F 7/003* (2021.01); *F24F 7/06* (2013.01);
(Continued)

(58) Field of Classification Search
CPC ......... B60H 1/24; B60H 3/0608; F24F 11/65; F24F 11/526; F24F 8/10; F24F 7/003;
(Continued)

(56) References Cited

U.S. PATENT DOCUMENTS

| 6,758,739 B1* | 7/2004 | Sangwan | ............. B60H 3/0085 454/75 |
| 8,145,383 B2* | 3/2012 | Prokhorov | ............. B60H 1/008 454/75 |

(Continued)

FOREIGN PATENT DOCUMENTS

| DE | 19651403 A1 | 6/1998 |
| DE | 10013841 A1 | 9/2001 |

(Continued)

OTHER PUBLICATIONS

Yang et al., "The impact of bacteria-derived ultrafine duct particles on pulmonary diseases", 2020, Experimental and Molecular Medicine, pp. 338-347. (Year: 2020).*

*Primary Examiner* — Avinash A Savani
*Assistant Examiner* — Dana K Tighe
(74) *Attorney, Agent, or Firm* — LEYDIG, VOIT & MAYER, LTD.

(57) ABSTRACT

The invention relates to a method for operating a ventilation system for indoor air in an indoor space, in particular a motor vehicle. The method comprises the steps of: providing a fresh air portion of supplied fresh air and a recirculated air volume flow according to a predetermined or selected operating strategy; determining settings for a recirculated air actuator for adjusting a fresh air portion, in particular a recirculated air flap or a recirculated air valve, and a fan power of a fan for adjusting a mixed air volume flow ($Q_M$) of supplied recirculated and fresh air; increasing the fresh air portion and/or the mixed air volume flow ($Q_M$) as a function of a pathogen filtration efficiency of a cabin filter and a predetermined contamination prevention volume flow as a pathogenic indoor concentration limit value ($C_P$) for a maximum concentration of pathogenic aerosols.

9 Claims, 2 Drawing Sheets

(51) Int. Cl.
    *F24F 7/003* (2021.01)
    *F24F 7/06* (2006.01)
    *F24F 8/10* (2021.01)
    *F24F 11/526* (2018.01)
    *F24F 13/10* (2006.01)
    *B60H 3/06* (2006.01)
    *F24F 11/00* (2018.01)
    *F24F 120/10* (2018.01)
    *F24F 130/00* (2018.01)

(52) U.S. Cl.
    CPC .............. *F24F 8/10* (2021.01); *F24F 11/526* (2018.01); *F24F 13/10* (2013.01); *B60H 3/0608* (2013.01); *F24F 2011/0002* (2013.01); *F24F 2120/10* (2018.01); *F24F 2130/00* (2018.01)

(58) Field of Classification Search
    CPC .......... F24F 7/06; F24F 13/10; F24F 2120/10; F24F 2130/00; F24F 2011/0002
    USPC .................................................. 454/139, 229
    See application file for complete search history.

(56) References Cited

U.S. PATENT DOCUMENTS

| | | | |
|---|---|---|---|
| 9,676,250 B2 * | 6/2017 | Weast | B60H 1/00842 |
| 10,190,957 B2 * | 1/2019 | Hoke | B60H 1/008 |
| 10,661,637 B2 * | 5/2020 | Kwon | B03C 3/32 |
| 10,696,143 B2 * | 6/2020 | Kwon | B60H 3/06 |
| 2004/0141875 A1 | 7/2004 | Doshi | |
| 2012/0152512 A1 * | 6/2012 | Mori | B60H 1/00864 |
| | | | 165/202 |
| 2012/0264361 A1 * | 10/2012 | Scheer | B60H 3/0035 |
| | | | 454/75 |
| 2016/0176261 A1 * | 6/2016 | Khorana | B60H 1/00821 |
| | | | 62/126 |

FOREIGN PATENT DOCUMENTS

| | | |
|---|---|---|
| DE | 102005006312 A1 | 8/2006 |
| DE | 102013220369 A1 | 4/2015 |
| DE | 102015117665 A1 | 4/2017 |
| DE | 102020005281 A1 | 11/2020 |
| EP | 1422089 A2 | 5/2004 |

* cited by examiner

METHOD AND DEVICE FOR OPERATING A VENTILATION SYSTEM FOR AIR IN AN INDOOR SPACE

CROSS-REFERENCE TO PRIOR APPLICATION

Priority is claimed to German Patent Application No. DE 10 2021 102 517.6, filed on Feb. 3, 2021, the entire disclosure of which is hereby incorporated by reference herein.

FIELD

The invention relates to ventilation systems, such as aeration and air conditioning systems or aeration and climate control systems for indoor spaces, in particular for indoor spaces of transportation means or other. The invention furthermore relates to the control or regulation of air treatment systems while observing a maximum pathogenic aerosol load for individuals located in the indoor space.

BACKGROUND

Ventilation systems for indoor spaces, in particular of transportation means, can be operated with various control strategies and operating modes. They may comprise, for example, temperature-controlled operation, recirculated air or secondary air operation, defrost operation for the fastest possible deicing of vehicle glass surfaces, such as glass windshields, an operation with maximum cooling of the indoor air, along with an operation for optimizing the air cleaning effect, in particular with respect to pathogenic aerosols, and the like.

Moreover, the current status of operating parameters of the ventilation system and of the state of the indoor air can also be appropriately displayed to a user.

The individual operating modes can be activated manually by the user or on the basis of a predetermined operating strategy based on environmental states or other operating conditions according to a predetermined program. Recirculated air or secondary air operation is advantageous in particular in the case of air treatment systems that are operated entirely or partly with the aim of regulating the air temperature in the indoor space, since the energy input when circulating already precooled or preheated indoor air cannot be smaller than in the case of a partial or maximum supply of outside air.

However, the use of recirculated air operation has the disadvantage that pathogenic aerosols, such as pollutant particles or bioaerosols, may accumulate in the indoor space. These may contain, for example, pathogenic viral copies, so that the risk of infection for individuals located in the indoor space increases when the indoor air is contaminated with such bioaerosols. For these, the risk of infection due to pathogen input caused by pathogenic ambient air can be neglected compared to the risk of infection by the pathogen input by indoor sources (as a rule, by other individuals located in the indoor space). Therefore, recirculated air operation can significantly increase the risk of infection for individuals located in the indoor space when there is no air cleaning strategy.

SUMMARY

In an embodiment, the present disclosure provides a method for operating a ventilation system for indoor air in an indoor space. The method comprises the steps of: providing a fresh air portion ($\lambda$) of supplied fresh air and a recirculated air volume flow ($Q_R$) according to an operating strategy; determining settings for a recirculated air actuator for adjusting the fresh air portion and a fan power of a fan for adjusting a mixed air volume flow ($Q_M$) of supplied recirculated and fresh air; and increasing the fresh air portion ($\lambda$) and/or the mixed air volume flow ($Q_M$) as a function of a pathogen filtration efficiency of a cabin filter and a predetermined contamination prevention volume flow as a pathogenic indoor concentration limit value ($C_P$) for a maximum concentration of pathogenic aerosols.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
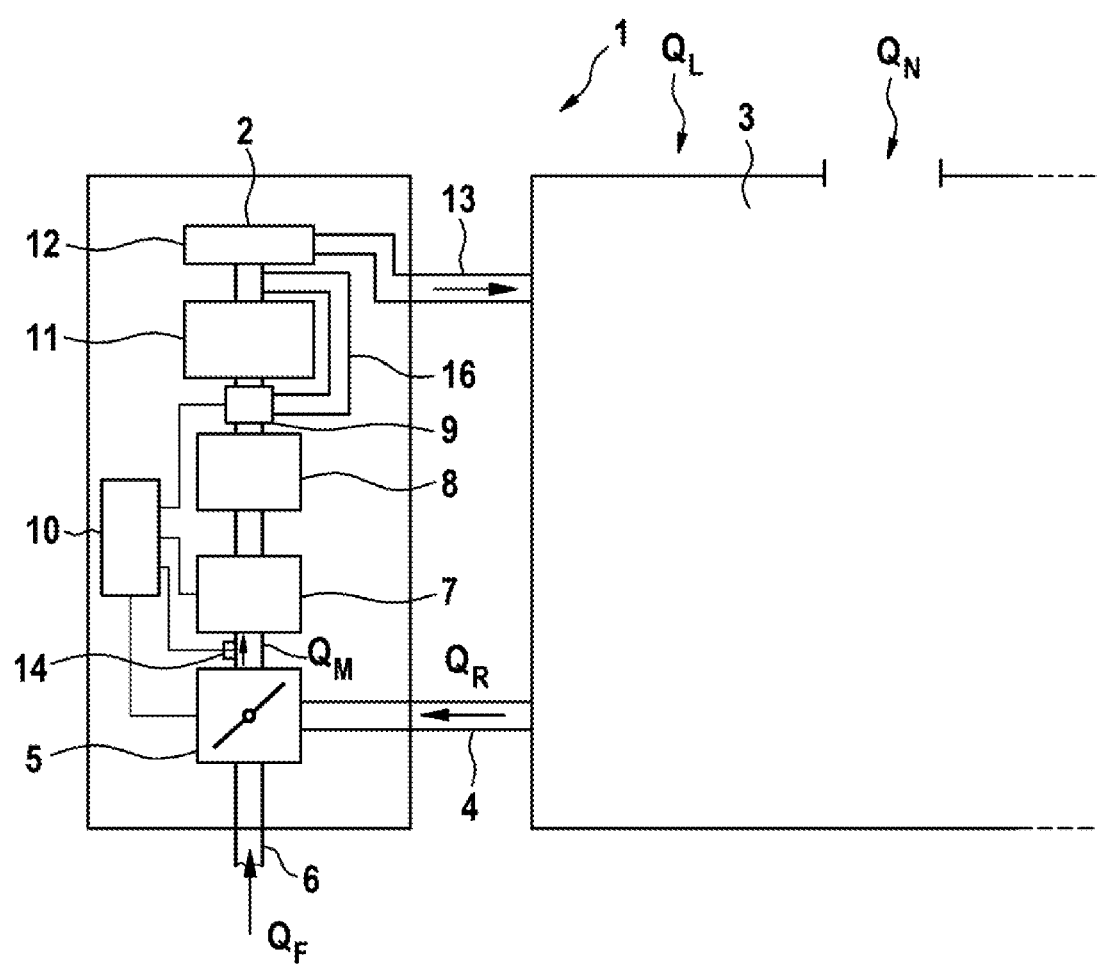
FIG. 1 is a schematic diagram of an air treatment system with a ventilation system for an indoor space.

It is an object of the present embodiments to provide a method for operating a ventilation system with which the pathogenic indoor space contamination with pathogenic aerosols caused by emission sources located in the indoor space, such as infectious or smoking individuals, is reduced.

This object is achieved by the method for operating a ventilation system and a ventilation system as described herein.

According to a first aspect, a method for operating a ventilation system for indoor air in an indoor space, particularly of a motor vehicle, is provided, comprising the steps of: providing a fresh air portion of supplied fresh air and a recirculated air volume flow according to a predetermined or selected operating strategy; determining settings for a recirculated air actuator for adjusting the fresh air portion, in particular a recirculated air flap or a recirculated air valve, and a fan power for adjusting a mixed air volume flow of supplied recirculated and fresh air; increasing the fresh air portion and/or the mixed air volume flow as a function of a pathogen filtration efficiency of a cabin filter and a predetermined contamination prevention volume flow as a pathogenic indoor concentration limit value for a maximum permissible concentration of pathogenic aerosols.

In this way, in a ventilation system for an air treatment system for an indoor space, it is achieved that the ventilation system circulates indoor air and adds to it a predeterminable variable fresh air portion according to a predetermined operating strategy, wherein the fresh air portion is adjusted as a function of a volume flow through the ventilation system and as a function of the maximum permissible pathogen load of pathogenic aerosols, such as pollutant particles and/or bioaerosols, inhaled by an individual while staying in the indoor space.

Part of the ventilation systems are cabin filters that capture pollutants from the air flows supplied to the indoor space. For this purpose, cabin filters comprise particle-filtering regions that filter out airborne particles and aerosols. In a further embodiment, cabin filters may additionally comprise adsorbing regions on the surfaces of which organic and/or inorganic gases from the air flows can accumulate.

From a technical point of view, recirculated air is defined as exhaust air that is recirculated into an air treatment system and returned to at least one chamber as a component of the supply air from which it was not taken. Secondary air, which is taken from a chamber and fed back to the same chamber after treatment, is not to be confused with recirculated air. Particularly when speaking of air treatment systems in vehicles, the term used instead of the correct technical term "secondary air operation" is the colloquial expression "recirculated air operation", which does not supply any ambient air, in order to, for example, achieve a desired temperature state more quickly. As a result of this "recirculated air operation", exhaust gases, particles or odors from the environment may also be temporarily prevented from entering the indoor space. For simplification purposes, the term "recirculated air" will be used below for "secondary and/or recirculated air".

The above method makes it possible to subject the specifications of an operating strategy of a ventilation system to compliance with a pathogenic indoor concentration limit value (in quantity unit/m$^3$, wherein quantity unit may comprise the number of viruses determined, for example, by the PCR method, or the viable virus count determined, for example, by the plaque forming units (PFU) method) of pathogenic aerosols, such as pollutant particles and/or bioaerosols, so that the exposure of individuals to pathogenic aerosols while staying in the indoor space is limited to below a critical concentration value specified by the pathogenic indoor concentration limit value.

The operating strategy can comprise a temperature-controlled operation, which provides for keeping a temperature of the indoor air constant, an operation with a maximum cooling capacity for the indoor air, a de-icing operation with a maximum heating capacity for the indoor air, and an air quality regulation of the indoor air, in particular taking into account energy-saving potentials. These operating strategies provide for adjusting the conveyed mixed air volume flow, adjusting the fresh air portion and possibly other settings.

Since the pathogen input into the indoor space caused by the ambient concentration of aerosols is negligible compared to the pathogen input by sources in the indoor space, the input of pathogen into the indoor space can be represented by an indoor source with pathogen emission rate E (quantity unit/h).

When considering the steady state (no temporal change in state without external influence at equilibrium), three processes as pathogen reducers can remove pathogens from the indoor air through bioaerosol discharge:

Pathogen discharge through air flows from the indoor space (building/cabin) due to the balance between incoming and outgoing mass flows:

$Q_L$—volume flow of infiltration through the indoor space shell (m$^3$/h)

$Q_N$—non-forced, natural ventilation, e.g. through open windows (m$^3$/h)

$Q_F$—fresh air volume flow through forced, mechanical convection (m$^3$/h)

Separation of pathogens through the filtration of circulating mixed air:

$Q_R$—recirculated air volume flow of forced mechanical recirculation (m$^3$/h)

$\eta_R$—pathogen filtration efficiency for pathogenic aerosols, such as pollutant particles or bioaerosols Deposition of pathogenic aerosols on indoor surfaces:

V—interior volume (m$^3$)

β—Coefficient for pathogen deposition on the indoor surfaces (h$^{-1}$)

By taking a quantitative approach to the processes that supply or remove pollutant particles or bioaerosols from the indoor air, with the simplification of a cumulative fresh air volume flow $Q^*_F = Q_F + Q_L + Q_N$ from the environment, the resulting indoor steady state concentration C of the pathogens of pollutant particles or bioaerosols can easily be determined given a well-mixed atmosphere of the indoor space and a negligibly small ambient concentration of pathogenic pollutant particles or bioaerosols:

$$C = \frac{E}{Q^*_F + Q_R \eta_R + \beta V}$$

When comparing this period of time with the periods of time spent by individuals in the indoor space, which are usually taken as a basis to evaluate a risk of infection, such an indoor steady state concentration is established shortly in particular in air-conditioned vehicle cabins: if an indoor space is free of any pathogen contamination and, at time t=0, the input of pathogen through an indoor source starts at pathogen emission rate E, the relaxation times of such systems are usually a few minutes, while the dwell times usually taken as a basis to evaluate the risk of infection may be several hours.

For a ventilation system configuration in a closed system, the steady state concentration C of pathogenic pollutant particles or bioaerosols in the indoor space, with exclusive recirculated air operation under the simplified assumptions of a critical contamination risk assessment or an infection risk assessment that there is no pathogen-diluting fresh air ventilation, no pathogen-diluting infiltration, and no discharge of pathogenic pollutant particles or bioaerosols from the indoor air through deposition or inactivation over time, results from the relationship:

$$C = \frac{E}{Q_R \eta_R}$$

Moreover, in order to assess the risk of infection for an individual in the indoor space, the maximum permissible pathogen load (i.e., a quantity of pathogenic pollutant particles or bioaerosols at the infection threshold) inhaled over their duration of stay in the indoor space can also be defined. It is the product of a maximum permissible indoor concentration $C_P$ and the respiratory volume inhaled during their dwell time. The maximum permissible pathogen load, e.g., indicated in a number of pollutant particles of a certain size or the number of PCR virus copies or plaque forming units, like the emission rate of different pathogen sources (as a rule, infected individuals) can also be specified based on infection studies depending on the type of pathogenic aerosols. The respiratory volume can be derived from the respiratory minute volumes of different activity states.

In the steady state, a required pathogen-specific air cleaning performance for pure recirculated air operation results as $$pCCM = C_P \eta_R Q_R \geq E,$$

wherein pCCM corresponds to the pathogen-specific air cleaning performance for a critical contamination risk assessment or a critical infection risk assessment (in the case of bioaerosols) without taking into account the infiltration, deposition and inactivation of pathogenic bioaerosols (quantity unit/h) during pure recirculated air operation (pCCM: pathogen Cumulate Clean Matter) (viral Cumulate Clean Matter=vCCM) based on Chinese Standard GB/T 18801-2015 (Air Cleaner) and $C_P$ corresponds to the pathogenic indoor concentration limit value (quantity unit/m³).

The above method relates in particular to an operating strategy that specifies a mixed air volume flow (corresponding to a recirculated air volume flow) of a ventilation system, without a fresh air component, depending on its pathogen-specific air cleaning performance. If a pathogenic indoor concentration limit value is specified for a dwell time, the pathogen-specific air cleaning performance to be ensured via all adjustable operating strategies of the ventilation system results from a recirculated air volume flow that, for reasons of infection prevention, must never be fallen short of. This recirculated air volume flow, which must not be fallen short of and which depends on the pathogen filtration efficiency of the cabin filter for the pollutant particles or the bioaerosol, advantageously supplements the operating strategies for the ventilation system, in order to avoid exposure of the individuals in the indoor space to pathogenic aerosols above a specified limit value.

In particular, in addition to the mixed air volume flow, the fresh air portion can also be determined by the above method, wherein the diluting effect of inflowing fresh air is taken into account by defining the fresh air portion. In particular, the pathogen-specific air cleaning performance is correspondingly increased by supplying fresh air:

$$pCCM^* = C_P(Q_F^* + \eta_R Q_R) \geq E,$$

wherein pCCM* corresponds to the pathogen-specific air cleaning performance for the mixed operation of supplied recirculated and fresh air in the steady state (unit quantity/h) for a critical contamination risk assessment or a critical infection risk assessment without taking into account the infiltration, deposition and inactivation of pathogenic bioaerosols.

In order to ensure effective protection against pollutant particles or effective infection prevention for individuals in an indoor space, the above method provides for establishing a contamination volume flow (infection prevention volume flow) $Q_{IS}$ for each operating state of an air treatment system according to the following formula, i.e., adjusting the pathogen-specific air cleaning performance necessary due to the pathogenic indoor emissions by selecting mixed air volume flow $Q_M=Q^*_F+Q_R\,\eta_R$ and fresh air portion according to the pathogen filtration efficiency and the pathogenic indoor concentration limit value that depends on the time spent in the indoor space. With an assessment of a critical pollutants contamination or a critical infection risk assessment without taking into account the infiltration, deposition and temporal inactivation of pathogenic bioaerosols, the following applies:

$$Q_M = Q_F^* + Q_R \eta_R \geq Q_{IS} = \frac{E}{C_P}$$

Here, a contamination volume flow (e.g., infection prevention volume flow in the case of pathogenic bioaerosols) represents the key figure calculated from the quotient of an indoor emission value and a value of the pathogenic indoor concentration threshold for the concentration of pollutant particles or other pathogenic aerosols.

With pure recirculated air operation, this results in a recirculated air volume flow $Q_R=Q_{IS}/\eta_R$ that is necessary for infection prevention.

During mixed operation, the following results as a function of a fresh air fraction $\lambda$:

$$\left(\frac{\lambda}{1-\lambda} + \eta_R\right)Q_R \geq Q_{IS} = \frac{E}{C_P},$$
wherein $\lambda = Q_F^* / (Q_F^* + Q_R)(\lambda \neq 1)$.

It is thus possible to control the pathogenic indoor contamination by changing the fresh air portion and by changing the recirculated air volume flow. In conjunction with the selected operating strategy, the fresh air portion or the recirculated air volume flow can now be adjusted.

In particular, the fresh air portion and/or the mixed air volume flow can be incrementally increased until a predetermined contamination prevention volume flow or a predetermined infection prevention volume flow is exceeded for the pollutant particles or the bioaerosol as a function of a pathogen filtration efficiency of the cabin filter.

Thus, in the temperature-control operation of the ventilation system, with a small difference between the temperature of the ambient air and the setpoint temperature of the indoor air (e.g., ambient temperature 5° C.<$\vartheta$<29° C.), the adjustment of the fresh air portion should be given higher priority than the adjustment of the recirculated air volume flow (up to $\lambda$=1). In contrast, the fresh air volume flow of very cold (e.g., $\vartheta$<5° C.) or very warm (e.g., $\vartheta$>29° C.) ambient air should not be changed but the recirculated air volume increased instead. Here, the above method provides that an infection prevention volume flow of $Q_{IS}$ should not be fallen short of in particular in the case of the generally energetically induced prioritization of the recirculated air volume flow.

It can be provided that the fresh air portion and/or the recirculated air volume flow is increased outside the predetermined operating strategy only when there is more than one individual in the indoor space or when no window is open that would ensure sufficient air exchange in the indoor space.

It can be provided, for example, for the operating strategy to consider the number of individuals in the indoor space as potential emission sources, since the emission rate of the pathogenic indoor sources significantly influences the indoor air concentration. The number of individuals present in vehicles can be determined, for example, by seat occupancy sensors of passenger restraint systems that are already present, or with the aid of an in-cabin camera. For example, the strategy of complying with the pathogenic indoor concentration limit value can be pursued according to the above method only if there is more than one individual in the indoor space.

In addition, the contamination or occurrence of infections can be evaluated depending on the location of the indoor space, in particular the location of the vehicle. If the vehicle is located in a high-risk area, the adjustment of the fresh air portion can be given lower priority accordingly. In addition, the operating strategy can evaluate the air quality of the indoor space using, for example, $CO_2$ air quality sensors, as a hygienic indication of the air quality. It can also specify a minimum fresh air portion.

According to one embodiment, the pathogen-specific air cleaning performance of a cabin filter can be determined as a function of a pathogen filtration efficiency of the cabin filter for pathogenic aerosols, the recirculated air volume flow, the fresh air portion, and the pathogenic indoor concentration limit value that depends on the time spent in the indoor space, wherein the pathogen filtration efficiency depends on the age of the cabin filter and/or on the cumulative air volume flow (e.g., quantity and properties of the mixed air volume flow of supplied recirculated and fresh air to be cleaned) through the cabin filter during its total service life.

It can be provided that either the fresh air portion or the mixed air volume flow is increased as a function of a prioritization, wherein the prioritization is determined according to the operating strategy as a function of a condition of the indoor air, a condition of the fresh air, and/or a target specification of the operating strategy.

According to one embodiment, it can be signaled, in particular visually or acoustically, if an intervention in the predetermined or selected operating strategy has occurred as a function of the pathogen filtration efficiency and the pathogenic indoor concentration limit value.

Furthermore, a bypass actuator for adjusting a cooling capacity can be controlled as a function of the selected operating strategy and as a function of the increased fresh air portion and/or mixed air volume flow.

According to a further aspect, a ventilation system for indoor air in an indoor space is provided, which is particularly suitable for carrying out the above-described method, comprising: a recirculated air actuator for variably adjusting a fresh air portion; a fan for variably generating a mixed air volume flow of supplied recirculated and fresh air; and a controller or control unit configured to provide a fresh air portion and a mixed air volume flow according to a predetermined or selected operating strategy, in order to control the recirculated air actuator for adjusting a fresh air portion and the fan having a fan power for adjusting the mixed air volume flow of supplied recirculated and fresh air and to increase the fresh air portion and/or the recirculated air volume flow as a function of a pathogen filtration efficiency of a cabin filter for the bioaerosol and an infection prevention volume flow.

DESCRIPTION OF EMBODIMENTS

FIG. 1 schematically shows an air treatment system 1 with a ventilation system 2 and an indoor space 3. The ventilation system 2 serves to treat air for the indoor space 3. The treatment can comprise the addition of fresh air, a preparation, a filtering, and a temperature control/air-conditioning of fresh and recirculated air. The treated air is supplied to the indoor space 3.

The operation of the ventilation system 2 is controlled or regulated by a controller or control unit 10 having a microcontroller, in which the functions of the operating strategy for the ventilation system 2 are implemented.

The ventilation system 2 extracts indoor air via an exhaust air line 4 and supplies it to a recirculated air actuator 5, in particular in the form of a recirculated air flap. The recirculated air actuator 5 is variably adjustable and can supply fresh air from the environment 15 to the indoor air withdrawn as recirculated air, which is supplied via a fresh air line 6. The fresh air portion in the mixed air volume flow of supplied recirculated and fresh air provided on the output side of the recirculated air actuator 5 is specified by the adjustment of the recirculated air actuator 5.

For this purpose, a controller or control unit 10 is provided, which the recirculated air actuator 5 adjusts in accordance with a fresh air portion to be specified.

The recirculated air actuator 5 is connected to an electrically controllable fan 7, the rotational speed or fan power of which can also be adjusted by the controller or control unit 10. The fan 7 effects the recirculated air flow through the ventilation system 2 and the intake of the fresh air from the environment 15.

A cabin filter 8 is arranged on the output side of the fan 7, which cabin filter 8 is capable of filtering particles, and in particular bioaerosols, out of the supplied air. The cabin filter 8 has a pathogen filtration efficiency, which depends on the age of the cabin filter 8 and the cumulated filtered air quantity of supplied recirculated and fresh air. In addition to the above-described pressure-side arrangement of the cabin filter downstream of the fan 7, the cabin filter 8 could also be arranged upstream of the fan 7 on the suction side.

A bypass actuator 9, in particular a bypass flap or a bypass valve, is arranged downstream of the cabin filter 8, which bypass actuator 9 can be variably adjusted in a manner as controlled or regulated by the controller or control unit 10. An adjustable portion or the entire mixed air volume flow of supplied recirculated and fresh air can be conducted by the bypass actuator 9 through a cooling unit 11 on the output side of the cabin filter 8, in order to cool down the flowing air in accordance with a cooling capacity predetermined or adjustable by the controller or control unit 10, or can be alternatively routed around the cooling unit 11 via the bypass line 16.

The object of the control by the bypass actuator 9 is to be able to route an increasing portion or the entire mixed air volume flow of supplied recirculated and fresh air around the cooling unit 11 via the bypass line 16 on the output side of the cabin filter 8, as the difference between the actual value of the indoor air temperature and the set point of the indoor air temperature decreases. As a result, the mixed air volume flow of supplied recirculated and fresh air required to ensure a pathogen-specific air cleaning performance can circulate in the ventilation system without absorbing cooling capacity and thereby withdrawing residual cold from the cooling unit 11.

The cooling unit 11 is connected to a heating unit 12 on the downstream side, in order to heat the flowing air in accordance with a heating capacity predetermined or adjustable by the controller or control unit 10. The output of the heating unit 12 is returned into the indoor space 2 via a feed line 13.

In addition, a volume or mass air flow sensor 14 can be provided, which makes it possible to directly or indirectly determine a measure of the mixed air quantity of supplied recirculated and fresh air. Furthermore, the fresh air portion can also be determined via the position of the recirculated air actuator 5 that is predetermined by the controller or control unit 10 or via further volume or mass air flow sensors. In operating strategies of the air treatment systems, such as temperature-controlled operation, a control deviation is the difference between the temperature set point of the indoor air as a reference variable and the actual temperature of the indoor air as a control variable. In accordance with the complexity of the control method of the ventilation system, the ambient temperature, the humidity or dew point of the environment and the indoor space, the building or vehicle surface temperature or the solar radiation, inter alia, can be determined as disturbance variables and considered by the controller or control unit 10.

Figure 2:
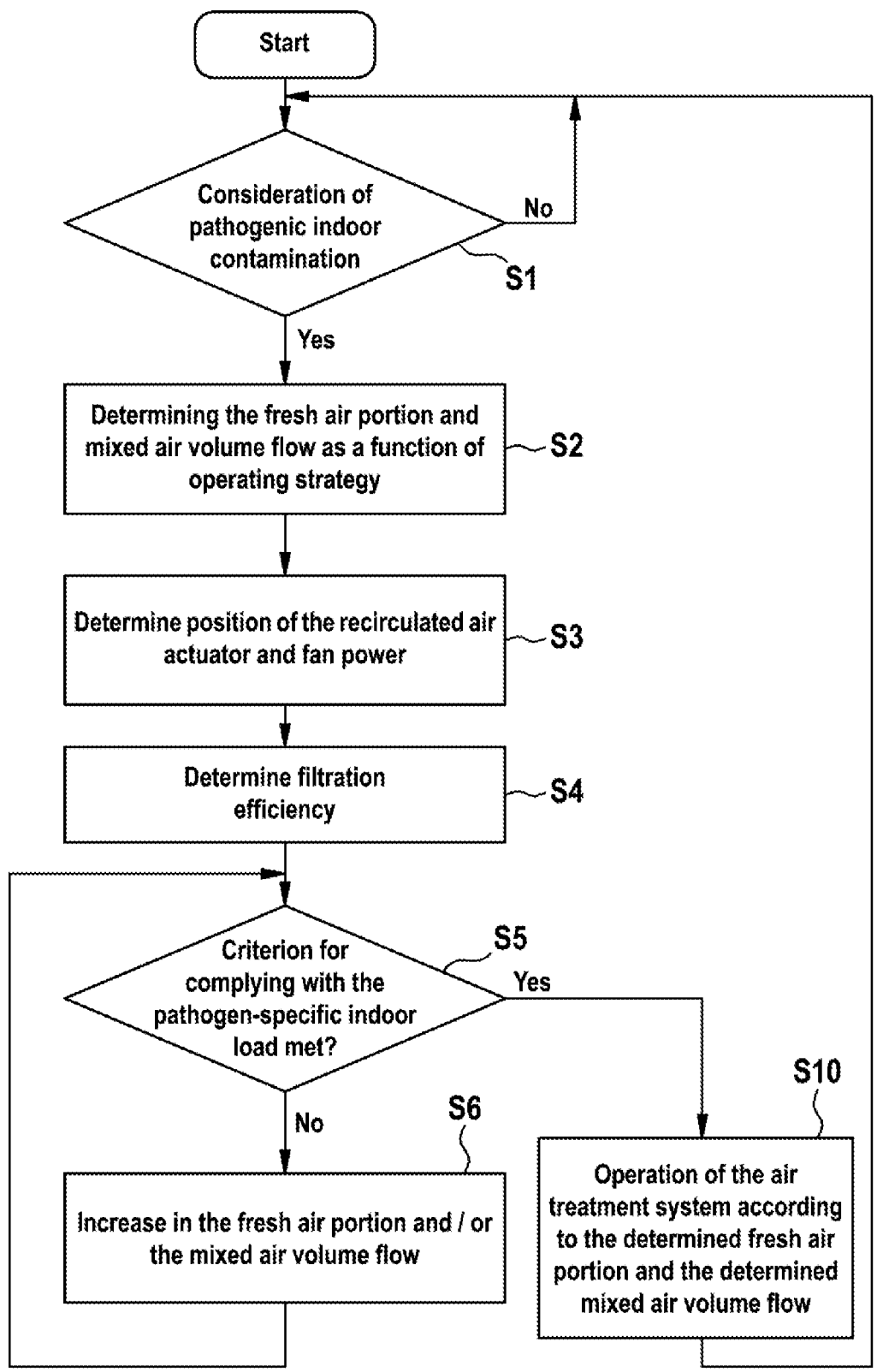
FIG. 2 is a flowchart illustrating a method for operating the ventilation system of FIG. 1.

A method for operating the air treatment system is carried out in the controller or control unit 10, as is described in more detail below with reference to the flowchart of FIG. 2. The method can be implemented as software or hardware in the controller or control unit 10. The method can be subject to updates and changes, for example, with regard to control methods or parameters (in particular contamination prevention volume flow or infection prevention volume flow or pathogen filtration efficiency of the cabin filter), which are carried out manually or by telemetry by changing the software of the ventilation system, in order to be able to take into account, for example, the latest findings of infection prevention from air quality control research.

In step S1, there is a check of whether a pathogenic indoor air contamination must be taken into account. For example, no pathogenic indoor air contamination has to be taken into account if there is only one individual in the indoor space. This can be determined, for example, using seat occupancy sensors in a vehicle or by suitable cameras, the images of which are evaluated using a person recognition method, or the like. Furthermore, the method for limiting the indoor concentration of pathogenic aerosols does not have to be carried out also if a window or the like is open, so that sufficient air exchange in the indoor space is ensured.

If it is determined that the pathogenic indoor contamination must be taken into account (alternative: yes), the method is continued with step S2, otherwise (alternative: No), the method is continued with step S10, in which the ventilation system 2 is operated in a conventional manner in accordance with the selected operating strategy. For this purpose, the selected operating strategy specifies a specific fresh air flow and a specific mixed air volume flow.

In step S2, the mixed air volume flow of supplied recirculated and fresh air and its fresh air portion are determined according to a selected operating strategy. The operating strategy can provide for a temperature-controlled operation, an operation with a maximum cooling capacity, a de-icing operation or a different other operating mode. Temperature-controlled operation can, for example, provide for keeping a temperature of the indoor air constant. For reasons of energy efficiency, such operating strategies provide for reducing the fresh air volume flow conveyed by the fan as far as possible and minimizing the circulation of the mixed air. However, this reduces the pathogen-specific air cleaning performance, so that the quantity of pathogenic aerosols filtered out is less. In order to maintain, for example, a microbiological air quality in the indoor space, a minimum fresh air portion may be necessary, which is added to the recirculated air. The fresh air portion and the recirculated air volume flow are determined according to the predetermined operating strategy in accordance with conventional methods known per se, in particular control methods.

In step S3, a position of the recirculated air actuator 5 and a fan power with which the fan 7 is electrically controlled is determined in accordance with the specific fresh air portion of the mixed air volume flow of supplied recirculated and fresh air and the specific recirculated air volume flow. Furthermore, depending on the operating strategy, a heating power and a position of the bypass actuator 9 can be defined for adjusting a cooling power.

Initially, in step S4, the pathogen filtration efficiency of the cabin filter 8 is determined for the pathogenic aerosol. This depends on the age of the cabin filter 8 and on the cumulative air volume flow through the cabin filter 8 during its total service life. The pathogen filtration efficiency can be determined, for example, via an assignment function, which is provided as a characteristic map or lookup table depending on the age of the cabin filter 8 and/or the total service life and/or the cumulative air volume flow through the cabin filter 8.

Furthermore, a contamination prevention volume flow $Q_{IS}$ is predetermined by the pathogenic indoor emission E and the indoor concentration limit value $C_P$. According to the following formula, a supply of fresh air $Q_F$ can contribute to fulfillment of the criterion for the contamination prevention volume flow. The following applies to a critical contamination risk assessment or infection risk assessment, without taking into account the infiltration, deposition and temporal inactivation of pathogenic aerosols:

$$Q_F^* + Q_R \eta_R \geq Q_{IS} = \frac{E}{C_P}$$

In step S5, there is a check of whether, given a specific pathogen filtration efficiency, the determined fresh air portion and the determined mixed air volume flow $Q_M$ satisfy the criterion of the contamination prevention volume flow that depends upon the pathogenic indoor emission E and the pathogenic indoor concentration limit value dependent upon the time spent in the indoor space. The following applies to a critical contamination risk assessment without taking into account the infiltration, deposition and temporal inactivation of pathogenic bioaerosols:

$$Q_{IS} = \frac{E}{C_P} \leq \left(\frac{\lambda}{1-\lambda} + \eta_R\right) Q_R,$$

wherein $\lambda = Q_F^* / (Q_F^* + Q_R)(\lambda \neq 1)$.

To determine the contamination prevention volume flow criterion, information regarding the assessment of the hazard risk or infection risk for an individual spending a period of time in the indoor space can be stored or implemented in the controller or control unit in order to operate the ventilation system. This can include a maximum permissible pathogen load inhaled by breathing, which can be represented as a product of a maximum permissible indoor concentration and the respiratory volume inhaled during the time spent in the indoor space. In addition to a maximum permissible pathogen load and an indoor emission rate from different pathogen sources, further variables relevant to contamination prevention can be used to evaluate a contamination risk based on contamination studies or infection studies, depending on the type of pathogenic aerosols. In order to determine a contamination prevention volume flow, these can be the variables relevant to contamination prevention of an indoor emission rate and of a pathogenic indoor concentration limit value, in particular in the critical case of a risk assessment without taking into account the infiltration, deposition and temporal inactivation of pathogenic bioaerosols.

The pathogen filtration efficiency of a cabin filter is a measure of how effectively the latter's particle-filtering regions filter out air-borne pathogenic aerosols. This variable represents a filtration efficiency over the entire particle size distribution of a pathogenic aerosol usually generated by contaminated/infected individuals in the indoor space. If, in laboratory tests on a cabin filter, a pathogen filtration efficiency is determined by means of a deviating particle size distribution, for example by means of a man-made viral fine aerosol having a smaller average geometric aerosol diameter, and/or if leaks in the ventilation system (leakages) are taken into account, it can become reasonable to accordingly correct or supplement the contamination prevention volume flow criterion in order to comply with the pathogen-specific indoor load.

If it is determined in step S5 that the settings resulting from the operating strategy regarding the determined fresh air portion and the determined recirculated air volume flow do not fulfill the above condition of the contamination prevention volume flow criterion (alternative: No), the method is continued with step S6; otherwise (alternative: Yes), the method is continued with step S10.

For example, the values determined through infection studies for a pathogen emission rate and a pathogenic indoor concentration limit value $C_P$ together with pathogen filtration efficiencies, which are determined by means of man-made viral fine aerosols with smaller average geometric aerosol diameters, along with typical leakage rates for the ventilation system in the critical case of a risk assessment without taking into account the infiltration, deposition and temporal inactivation of pathogenic bioaerosols may establish a value of 170 $m^3$/h for an infection prevention volume flow criterion:

In the case of mere fresh air operation of the ventilation system ($\lambda=1$), this contamination prevention volume flow criterion would be met in the case of a fresh air volume flow of greater than or equal to 170 $m^3$/h as specified by the operating strategy (alternative: Yes, continuation with step S10 of the method). With a fresh air volume flow of less than 170 $m^3$/h as specified by the operating strategy, this contamination prevention volume flow criterion would not be met (alternative: No, continuation with step S6 of the method).

In the case of mere recirculated air operation of the ventilation system ($\lambda=0$), the fulfillment of this contamination prevention volume flow criterion depends on the values of the recirculated air volume flow and the pathogen filtration efficiency. Given a recirculated air volume flow of 200 $m^3$/h as specified by the operating strategy and a pathogen filtration efficiency of 85%, the infection prevention volume flow criterion would be met barely (alternative: Yes, continuation with step S10 of the method).

In contrast, given a recirculated air volume flow of less than 170 $m^3$/h as specified by the operating strategy, the contamination prevention volume flow criterion could no longer be fulfilled, even with the maximum technically possible pathogen filtration efficiency of 100% (alternative: No, continuation with step S6 of the method).

In the case of mixed operation of recirculated and fresh air of the ventilation system ($0<\lambda<1$), the fulfillment of this contamination prevention volume flow criterion depends on values of the recirculated air volume flow and fresh air portion specified by the operating strategy, as well as on the pathogen filtration efficiency value. Thus, in the case of a recirculated air volume flow of 60 $m^3$/h as specified by the operating strategy and a pathogen filtration efficiency of 85%, the contamination prevention volume flow criterion would just be met if the fresh air portion predetermined by the operating strategy does not fall below 67% (alternative: Yes, continuation with step S10 of the method).

In contrast, in the case of the same recirculated air volume flow of 60 $m^3$/h as specified by the operating strategy, the contamination prevention volume flow criterion would not be met even with the maximum technically possible pathogen filtration efficiency of 100%, if the fresh air portion predetermined by the operating strategy falls below 64% (alternative: No, continuation with step S6 of the method).

In step S6, according to a prioritization, the fresh air portion to be adjusted (by corresponding adjustment of the recirculated air actuator) and/or the mixed air volume flow of supplied recirculated and fresh air (by corresponding adjustment of the fan power) is correspondingly increased, in order to satisfy the above condition. The prioritization can be provided according to the operating strategy, depending on a state of the indoor air, a state of the fresh air, and a target specification of the operating strategy. For example, in a temperature-control mode, the increase in the fresh air portion can be given higher priority if the temperature difference between the setpoint temperature of the indoor air and the temperature of the outside air is less than a predetermined temperature difference threshold value, and the increase in fan power can be given higher priority if the temperature difference between the setpoint temperature of the indoor air and the temperature of the outside air is greater than a temperature difference threshold.

For example, in order to meet the pathogen-specific indoor contamination criterion, either the increase in the fresh air portion and/or the recirculated air volume flow can be given higher priority also in the application case shown above in the description of step S5.

If, even with a maximum technically possible pathogen filtration efficiency of 100%, the contamination prevention volume flow criterion was not just fulfilled because the recirculated air volume flow predetermined by the operating strategy is 60 $m^3$/h and the fresh air portion predetermined by the operating strategy is 64%, preferably the fresh air portion would be increased further for example in a temperature-control mode, if the temperature difference between the setpoint temperature of the indoor air and the temperature of the outside air is less than a specified temperature difference threshold value. In contrast, the fan power would preferably be further increased if the temperature difference between the setpoint temperature of the indoor air and the temperature of the outside air is greater than a temperature difference threshold value.

Similar prioritization patterns can be carried out depending on a particulate and pollutant contamination of the ambient air. In addition, a specification for protecting the cabin filter can cause a reduction of the fresh air portion according to a predetermined weighting.

This is followed by returning to step S5.

In step S10, the ventilation system can be operated in accordance with the specified fresh air portion and the specified recirculated air volume flow. Furthermore, based on the indoor contamination reduction with pathogenic aerosols, the intervention in the operating strategy can be displayed to the user in a corresponding manner. This can inform the user, in particular, of why the fan power is higher than expected, especially if this is accompanied by a lower acoustic comfort.

This can be signaled by a display, for example, visually via the display elements known from vehicles (in form of a pictograph or as a text message of digital display panels) and/or with an acoustic sound or a voice message in one or more of the following cases: upon activation or deactivation of the method according to step S1, and in case of a (first) intervention of the method in the usual operating strategy after commencement of the ride or stop by a fan speed (increased) or flap positions (recirculated air/fresh air, bypass) changed thereby, in particular if interfering effects (lower acoustic comfort due to increased fan speed) could be expected to occur.

It would also be possible, in some embodiments, to send information to systems, such as smartphones, etc., connected to the vehicle.

In step S10, the bypass actuator 9 can furthermore be set according to a temperature control provided for in the selected operating strategy. In the case of an increased mixed air volume flow effected by the above method, a change in the adjustment of the bypass actuator 9 can thereby result.

If, for example, when using the "temperature-controlled" operating strategy in a hot environment, the indoor space has already been adjusted close to the lower setpoint temperature by longer operation of the ventilation system (low control deviation, high thermal comfort is achieved), no mixed air volume flow or only a small mixed air volume flow would be necessary due to the operating strategy. If a significantly higher mixed air volume flow is required by the method (due to contamination prevention) and this mixed air volume flow would be passed through the evaporator, this may possibly result in the further undesired cooling of the indoor space and the residual cold of the evaporator is no longer available for subsequent cooling requirements, since it has already been transported away.

While the embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below.

Additionally, statements made herein characterizing the embodiments refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a ventilation system for indoor air in an indoor space, the method comprising:
   providing a fresh air portion ($\lambda$) of supplied fresh air and a recirculated air volume flow ($Q_R$) according to an operating strategy;
   determining settings for a recirculated air actuator for adjusting the fresh air portion and a fan power of a fan for adjusting a mixed air volume flow ($Q_M$) of supplied recirculated and fresh air; and
   increasing the fresh air portion ($\lambda$) and/or the mixed air volume flow ($Q_M$) as a function of a pathogen filtration efficiency of a cabin filter and a predetermined contamination prevention volume flow as a pathogenic indoor concentration limit value ($C_P$) for a maximum concentration of pathogenic aerosols,
   wherein the fresh air portion ($\lambda$) and/or the mixed air volume flow ($Q_M$) is incrementally increased until a pathogenic indoor concentration determined by the pathogen filtration efficiency of the cabin filter and the predetermined contamination prevention volume flow is below a threshold value.

2. The method according to claim 1, wherein increasing the fresh air portion ($\lambda$) and/or the mixec air volume flow ($Q_M$) is carried out outside the operating strategy responsive to determining that there is more than one individual in the indoor space or responsive to determining that no window is open.

3. The method according to claim 1, wherein the operating strategy specifies at least one of: a temperature-controlled operation, which provides for keeping a temperature of the indoor air constant; an operation with a maximum cooling capacity for the indoor air; or a de-icing operation with a maximum heating capacity for the indoor air.

4. The method according to claim 1, wherein the pathogen filtration efficiency of a cabin filter depends on an age of the cabin filter and/or on a cumulative air volume flow through the cabin filter during a total service life of the cabin filter.

5. The method according to claim 1, wherein either the fresh air portion ($\lambda$) or the mixed air volume flow ($Q_M$) is increased as a function of a prioritization, wherein the prioritization is determined according to the operating strategy as a function of at least one of: a condition of the indoor air, a condition of the fresh air, and/or a target specification of the operating strategy.

6. The method according to claim 1, wherein it is signaled, in particular visually or acoustically, if an intervention in the predetermined or selected operating strategy has occurred as a function of the pathogen filtration efficiency and the pathogenic indoor concentration limit value ($C_P$).

7. The method according to claim 1, wherein a bypass actuator for adjusting a cooling capacity is controlled as a function of the operating strategy and as a function of the increased fresh air portion ($\lambda$) and/or the mixed air volume flow ($Q_M$).

8. A ventilation system for indoor air in an indoor space, the system comprising:
   a recirculated air actuator, which is configured to variably adjust a fresh air portion ($\lambda$);
   a fan for generating a mixed air volume flow ($Q_M$) of supplied recirculated and fresh air;
   a controller or control unit configured to provide the fresh air portion ($\lambda$) and the mixed air volume flow ($Q_M$) according to an operating strategy, in order to control the recirculated air actuator for adjusting the fresh air portion ($\lambda$) and the fan having a fan power for adjusting the mixed air volume flow ($Q_M$) of supplied recirculated and fresh air and in order to increase the fresh air portion ($\lambda$) and/or the mixed air volume flow ($Q_M$) as a function of a pathogen filtration efficiency of a cabin filter and a predetermined contamination prevention volume flow as a pathogenic indoor concentration limit value ($C_P$) for a maximum concentration of pathogenic aerosols,
   wherein the controller or control unit is further configured to incrementally increase the fresh air portion ($\lambda$) and/or the mixed air volume ($Q_M$) until a pathogenic indoor concentration determined by the pathogen filtration efficiency of the cabin filter and the predetermined contamination prevention volume flow is below a threshold value.

9. A method for operating a ventilation system for indoor air in an indoor space, the method comprising:
- providing a fresh air portion ($\lambda$) of supplied fresh air and a recirculated air volume flow ($Q_R$) according to an operating strategy;
- determining settings for a recirculated air actuator for adjusting the fresh air portion and a fan power of a fan for adjusting a mixed air volume flow ($Q_M$) of supplied recirculated and fresh air; and
- increasing the fresh air portion ($\lambda$) and/or the mixed air volume flow ($Q_M$) as a function of a pathogen filtration efficiency of a cabin filter and a predetermined contamination prevention volume flow as a pathogenic indoor concentration limit value ($C_P$) for a maximum concentration of pathogenic aerosols,
- wherein a bypass actuator for adjusting a cooling capacity is controlled as a function of the operating strategy and as a function of the increased fresh air portion ($\lambda$) and/or the mixed air volume flow ($Q_M$).

* * * * *